United States Patent [19]
Maiden et al.
[11] Patent Number: 4,588,065
[45] Date of Patent: May 13, 1986

[54] ESCALATOR WITH CONTROLLED BRAKE

[75] Inventors: Charles W. Maiden, Brentwood; Ernest F. Conroy, Jr., Penn Hills, both of Pa.; John G. Dorman, Randolph, N.J.

[73] Assignee: Westinghouse Electric Corp., Pittsburgh, Pa.

[21] Appl. No.: 644,754

[22] Filed: Aug. 27, 1984

[51] Int. Cl.[4] .......... B65G 43/00

[52] U.S. Cl. .......... 198/323; 198/855; 192/9; 188/181 C

[58] Field of Search .......... 198/322, 323, 326, 854, 198/855, 856; 192/0.076, 9; 303/95, 96, 98, 100, 108; 188/181 C

[56] References Cited

U.S. PATENT DOCUMENTS 4,231,452 11/1980 Kraft .......... 198/854 X

*Primary Examiner*—Joseph E. Valenza
*Assistant Examiner*—Lyle Kim
*Attorney, Agent, or Firm*—D. R. Lackey

[57] ABSTRACT

An escalator having improved brake control, to limit the rate of deceleration immediately following a stop command, and to quickly cause the actual speed of the escalator to closely follow a linearly declining speed ramp of a speed pattern signal. The signal controlling the brake is pulse duration modulated such that the brake responds to the average pulse duration, and braking torque is applied gradually and essentially linearly. The reference speed pattern has a substantially constant portion and a declining ramp portion. To limit the initial deceleration, the constant portion of the speed pattern is controlled to be a function of the actual speed signal, and the declining ramp portion of the reference signal is controlled to start when the actual speed is equal to the constant portion of the reference speed signal.

7 Claims, 4 Drawing Figures

ESCALATOR WITH CONTROLLED BRAKE

BACKGROUND OF THE INVENTION

1. Field of the Invention

This invention relates in general to transportation apparatus, such as escalators, and more specifically, to escalators having improved braking control which includes a reference speed signal.

2. Description of the Prior Art

Escalators are provided with an electrically released, mechanically applied brake capable of stopping an up or down traveling escalator with any load less than the design load of the brake.

In the down-operating mode, when a stop command is initiated, the escalator may begin to travel faster, if there is a sufficient load, unless the brake is energized simultaneously with the stop command. To avoid this situation, braking action should occur as soon as the power is removed from the escalator. With the escalator fully loaded in down operation and the brake applied continuously, it may take several inches of travel to bring the escalator to a complete stop. With no load in the down travel direction, and with the brake applied at the same instant as the stop signal, the escalator may stop very quickly. It would therefore be desirable to modulate the braking action so that the stopping distance is approximately the same for both the fully loaded and unloaded down traveling escalator. Likewise it would be desirable to obtain the same deceleration rate for all load conditions.

When the escalator is operating in the up mode, and the brake is energized when the stop is initiated, the escalator may stop within approximately 1.5 inches under any load condition from no load to full load. If the brake is not energized with the stop command, the escalator may stop after approximately 16 inches of travel for no load and about 4 inches for full load. If loaded, the escalator reverses unless the brake is applied. A flywheel may be used to extend escalator travel in the up direction to obtain a smoother deceleration.

U.S. patent application Ser. No. 605,041, filed Apr. 30, 1984, entitled "Conveyor Brake Control", discloses an arrangement for obtaining a more uniform deceleration rate for different travel directions and loads. The apparatus discloses in this co-pending patent application uses a feedback arrangement in which a reference speed pattern signal representing the desired speed of the escalator is compared with a signal representing the actual speed. The reference speed pattern signal includes a constant segment followed by a linearly declining ramp segment. A signal representing the difference can then be used to control a motor and/or a brake, as required to follow the speed pattern. In this co-pending patent application, the initial value of the speed pattern reference signal is a fixed value.

During testing and actual use of the brake control apparatus described in the co-pending patent application, the results were not as uniform as expected. The response time of the brake, the load on the escalator and the effect of the dynamic braking of the energized motor, which is lost going into a stop mode, all interact to provide a non-uniformity in the ability of the control to cause the actual speed to quickly track the speed pattern. It was also found that the initial deceleration may become quite large before the escalator speed is brought under the control of the declining ramp segment of the reference speed pattern signal.

SUMMARY OF THE INVENTION

Briefly, the present invention is a new and improved escalator having a controlled braking system which utilizes a speed pattern reference signal to control escalator speed. The reference speed pattern signal has two portions: a substantially constant portion and a linearly declining ramp portion. In the present invention, the substantially constant amplitude portion of the reference speed pattern signal is controlled to be a function of the actual escalator speed. In other words, the reference signal is controlled to have a predetermined control differential amplitude with respect to the actual escalator speed. Also, the declining ramp portion of the reference signal is deliberately delayed. Instead of being initiated with the stop signal, it is controlled to start when the escalator speed reaches the constant amplitude portion of the reference speed pattern signal.

BRIEF DESCRIPTION OF THE DRAWINGS

The invention may be better understood and further advantages and uses thereof more readily apparent when considered in view of the following detailed description of exemplary embodiments, taken with the accompanying drawings in which.

DESCRIPTION OF THE PREFERRED EMBODIMENTS

Figure 1:
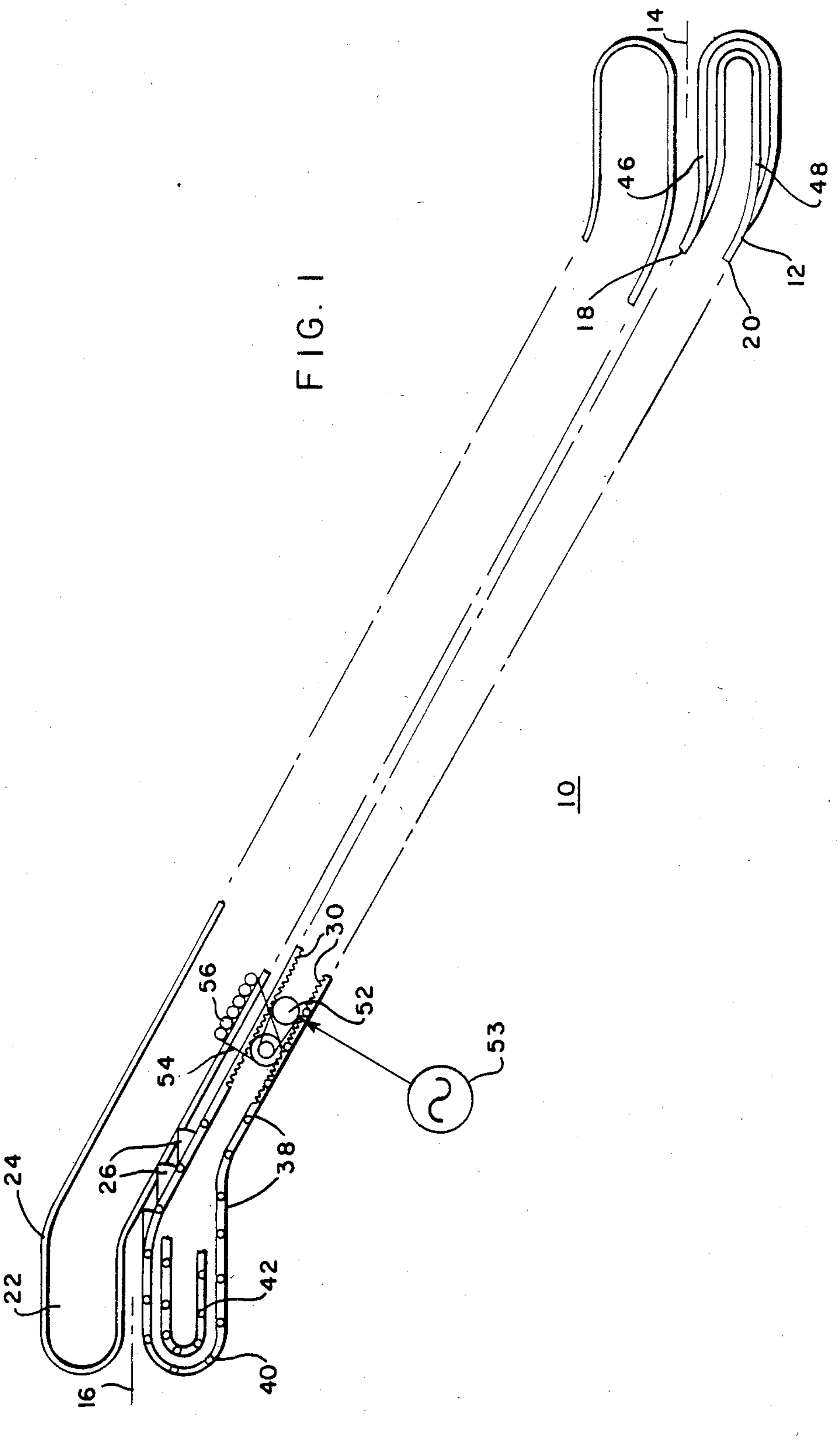
FIG. 1 is an elevational view of an escalator, which may be constructed according to the teachings of the present invention.

Referring now to FIG. 1, there is shown an escalator 10 of the type that may utilize the teachings of the present invention.

The escalator 10 employs a conveyor 12 for transporting passengers between a first or lower landing 14 and a second or upper landing 16. The conveyor 12 is of an endless type, having an upper load bearing run 18 on which passengers stand while being transported between the upper landing 16 and the lower landing 14. The escalator 10 also has a lower return run 20. A balustrade 22 is disposed above the conveyor 12 for guiding a continuous flexible handrail 24.

The conveyor 12 includes a plurality of steps 26, only a few of which are shown in FIG. 1. The steps 26 are each clamped to a step axle (not shown in FIG. 1) and move in a closed path. The conveyor 12 may be driven by any one of the well-known techniques, including a modular drive arrangement disclosed in U.S. Pat. No. 3,677,388, which is assigned to the same assignee as the present invention.

As disclosed in U.S. Pat. No. 3,677,388, the conveyor 12 includes an endless belt 30 having first and second sides, with each side formed of toothed links 38, interconnected by the step axles to which the steps 26 are connected. The steps 26 are supported by main and trailer rollers 40 and 42, respectively, at opposite sides of the endless belt 30. The main and trailer rollers 40 and 42 cooperate with support and guide tracks 46 and 48, respectively, to guide the steps 26 in an endless path or loop.

The steps 26 are driven by a modular drive unit 52, powered by a power source 53 which includes sprocket wheels and a drive chain for engaging the links 38. The modular drive unit 52 includes a handrail drive pulley belt 54, on each side of the conveyor 12, for driving a handrail drive unit 56.

Figure 2:
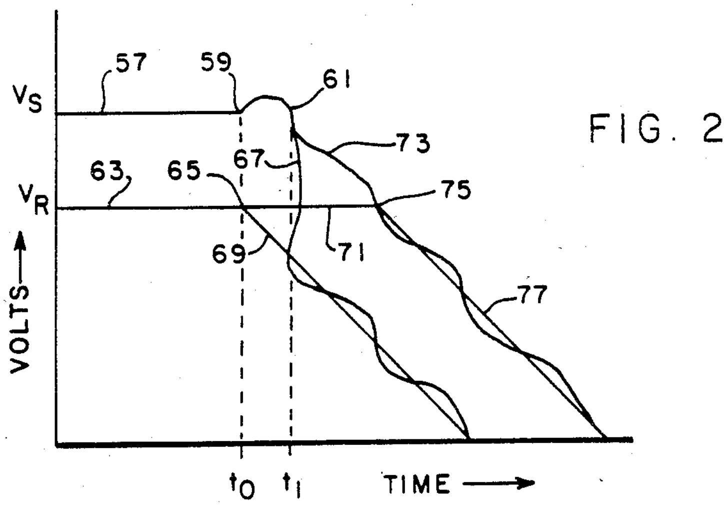
FIG. 2 is a graph showing the improvement in response when the start of the speed pattern ramp is delayed until the actual speed of the escalator drops to the level of the constant speed portion of the speed pattern.

FIG. 2 is a graph illustrating a voltage (designated $V_S$) representing the actual speed of the escalator 10 when traveling downwardly with a passenger load. FIG. 2 also shows a reference speed pattern signal (designated $V_R$) representing the desired speed. The objective of the present invention is to brake the escalator 10 such that $V_S$ closely tracks $V_R$, to cause a velocity based control system to behave like a constant deceleration based control system. If a stop is initiated at time $t_0$, it will be noted that there is a slight increase in speed $V_S$, from a constant portion 57, which increase starts at point 59 and continues to point 61 at time $t_1$. The amplitude and duration of this increase in speed is dependent on the loading of the escalator 10. The speed pattern $V_R$ has a fixed, constant portion 63. If the declining portion of the reference speed pattern signal $V_R$ is initiated at time $t_0$, at point 65, it will be noted that the actual speed $V_S$ drops rapidly along curve portion 67, producing a large initial deceleration before the speed is brought under control of the declining ramp portion 69 of the reference speed pattern signal $V_R$. A feature of the present invention is to controllably delay the start of the ramp 69 until the speed $V_S$ of the escalator 10 equals the reference speed $V_R$. Thus instead of starting the ramp 69 at point 65, the constant portion 63 is allowed to continue along portion 71. Since the speed pattern is constant in this area, the actual speed $V_S$ does not drop sharply along curve portion 67, but it follows a more desirable declining path 73.

When the actual speed $V_S$ drops to a value which is equal to the fixed or constant speed portion of the speed pattern $V_R$, which occurs at point 75 in FIG. 2, the ramp portion 77 of the speed pattern $V_R$ is initiated.

Figure 3:
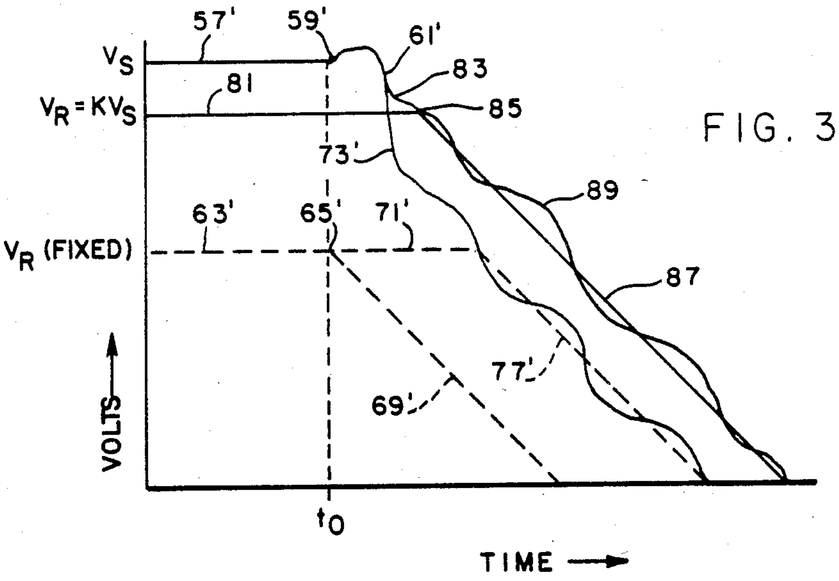
FIG. 3 is a graph showing the improvement in response when the constant speed portion of the speed pattern is controlled to track the actual speed of the escalator, until a stop is initiated, coupled with the ramp delay feature of FIG. 2.

This dynamic delay feature functions exceedingly well when the difference between the actual speed $V_S$ and the desired speed $V_R$, at the start of the stopping sequence, is small. In certain circumstances, the actual escalator speed may be substantially greater than the fixed-value reference speed. When this occurs, the actual speed $V_S$ may drop rapidly at the start of braking, and the deceleration rate may become undesirably high, before the actual speed signal starts to track the speed pattern signal. As shown in FIG. 3, this is true when the declining ramp portion of the reference speed $V_R$ is delayed until $V_S=V_R$. To facilitate the comparison, like reference numerals, except for a prime mark, are used to identify like portions of the curves in FIGS. 2 and 3. This problem is alleviated by another feature of the invention in which the constant portion of the reference speed $V_R$ is controlled as a function of the actual speed $V_S$. This is indicated in FIG. 3 where $V_R=kV_S$. In other words, $V_R$ is provided by multiplying $V_S$ by a constant K which is less than unity. With this functional relationship the reference speed closely tracks the actual speed before a stop is initiated. The tracking includes an inherent delay feature which ignores temporary speed changes. With both the ramp delay feature and the tracking feature, the actual escalator speed $V_S$ will promptly track the reference speed $V_R$, without a large initial deceleration rate. Thus, the objective of making a velocity based braking control system behave as a constant deceleration rate control system is achieved.

More specifically, as shown in the graph of FIG. 3, the speed pattern $V_R$ includes a dynamic portion 81 which tracks portions 57'. Thus, when a stop is initiated at time $t_0$, the difference between the actual and desired speeds is small, and the actual speed reduces along curve portion 83, instead of along the steeper portion 73'. When the actual speed $V_S$ reaches the desired speed $V_R$ at point 85, the linearly decreasing ramp starts to decelerate the escalator at a substantially constant rate. It will be noted that the actual speed $V_S$ quickly tracks ramp 87 along curve portion 89.

Figure 4:
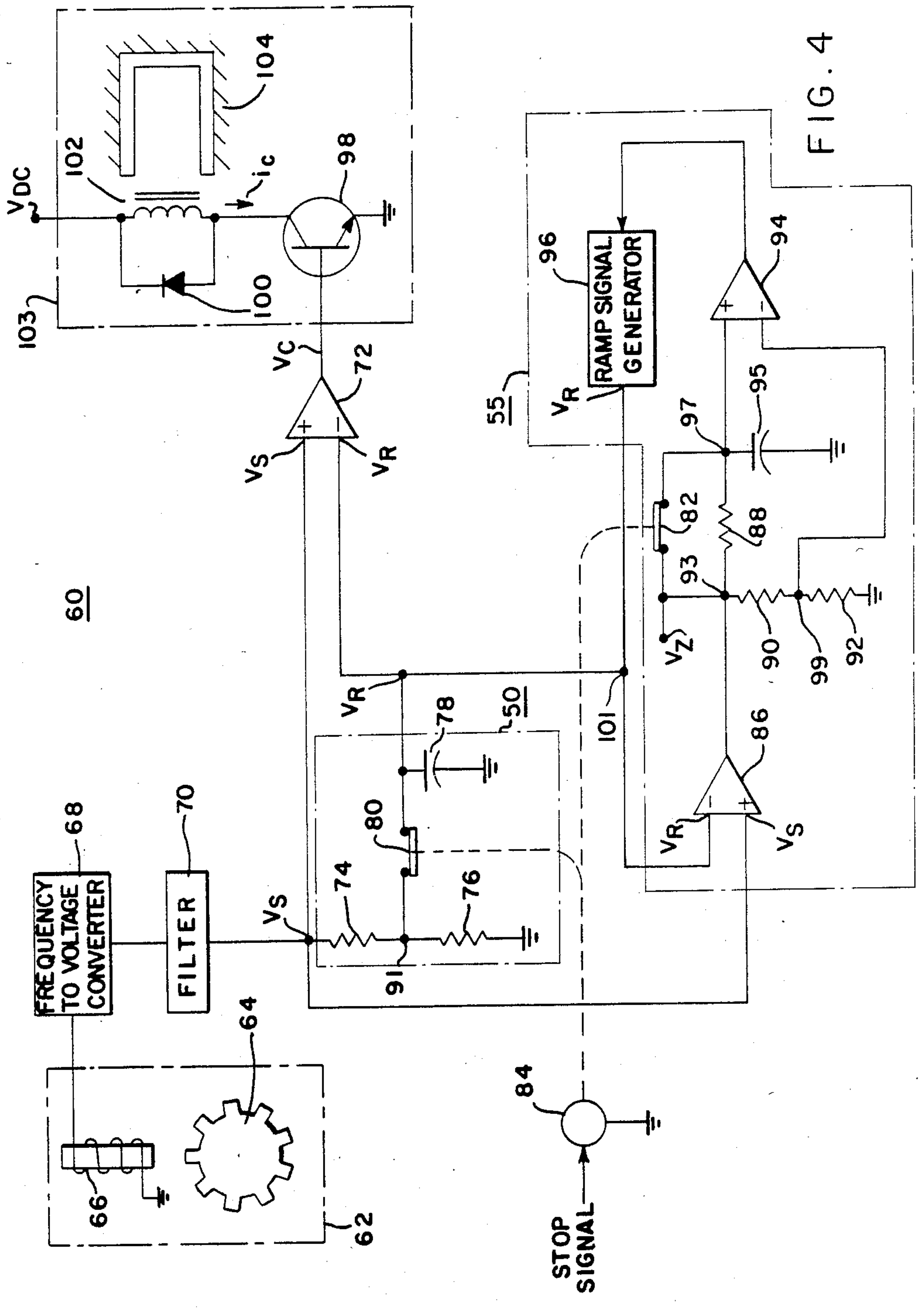
FIG. 4 is a schematic diagram of an escalator brake control system, constructed according to the teachings of the present invention.

FIG. 4 is a schematic diagram including circuits providing means for implementing both of the hereinbefore mentioned features of the invention, i.e., first means so far providing the constant portion of the reference signal $V_R$ is dynamic rather than static, being controlled to be a function of the actual speed signal $V_S$, and second means 55 for making the point at which the ramp segment of $V_R$ begins dynamic, being controlled to be a function of when the magnitude of the actual speed signal $V_S$ drops to the magnitude of the ramp voltage $V_R$.

FIG. 4 illustrates an escalator brake control system 60 constructed according to the teachings of the invention. System 60 may be digital, analog, or a hybrid. For purposes of example, a hybrid system is disclosed. A speed sensor 62 includes a toothed wheel 64, which is driven in synchronism with a selected component of the modular drive unit 52 shown in FIG. 1 and a pick-up 66 is disposed to detect the teeth of the toothed wheel 64, providing a signal rate proportional to the actual speed of the escalator 10. Sensor 62 may be of an optical or magnetic type. The digital type signal from the speed sensor 62 is input to a frequency-to-voltage converter 68. An output signal from the frequency-to-voltage converter 68 is input to a filter 70 for producing an analog speed signal designated $V_S$. A non-inverting input terminal of a comparator 72 is responsive to the speed signal $V_S$. The non-inverting input terminal of comparator 72 is also connected to ground via a series combination of resistors 74 and 76. An inverting input terminal of comparator 72 is connected to ground via a capacitor 78. The junction 91 between the resistors 74 and 76 is also connected to capacitor 78 via a relay contact 80.

Signal $V_S$ is also input to a non-inverting input terminal of a comparator 86. A terminal 93 is connected to an output terminal of comparator 86 and to ground via a series combination of resistors 90 and 92. Terminal 93 is also connected to ground via a series combination of a resistor 88 and a capacitor 95. Resistor 88 is shunted by a relay contact 82, and terminal 93 is connected to a constant dc voltage designated $V_Z$ in FIG. 4. The junction 97 of resistor 88 and capacitor 89 is connected to a non-inverting input terminal of a comparator 94. An inverting input terminal of comparator 94 is connected to the junction 99 between resistors 90 and 92. The output of comparator 94 is connected to a ramp signal generator 96. An output terminal 101 of the ramp signal generator 96 is connected to the inverting input terminal of comparator 72 and also to the inverting input terminal of comparator 86. Relay contacts 80 and 82 are closed when escalator 10 is in a steady-state running mode, and opened by a relay coil 84 in response to a stop signal.

Comparator 72 produces a control signal $V_C$, which is input to a base terminal of a transistor 98. An emitter terminal thereof is connected to ground, and a collector terminal thereof is connected to a dc power supply via a brake control coil 102. A brake shoe 104 is controlled by the brake control coil 102. A diode 100 is connected across the brake control coil 102 such that a cathode terminal of the diode 100 is connected to the dc power supply. Transistor 98, brake control coil 102, brake shoe 104, and diode 100 constitute a brake 103.

In operation, the speed sensor 62 generates an escalator speed signal. The sensor 66 is mounted in proximity to the toothed wheel 64, which may be mounted on the brake shaft, for example, of the escalator 10. One example of such a mounting arrangement is disclosed in U.S. Pat. No. 4,231,452, which is assigned to the assignee of the present invention. In one embodiment of the present invention the sensor 66 is a magnetic sensor producing a magnetic field that is charged by the approach and passing of a tooth of the toothed wheel 64. This change produces a voltage in the sensor 66 exactly as in a conventional electrical generator. In this manner, the sensor 66 converts mechanical rotation, representing the speed of the escalator 10, into a pulse train having a frequency directly proportional thereto.

The actual speed (represented by $V_S$) of the escalator 10 oscillates slowly about the reference speed (represented by $V_R$) as the brake 103 is applied. The pulse train, representing escalator speed and produced by the speed sensor 62, is converted to a slowly varying dc signal by the frequency-to-voltage converter 68. The actual frequency of the varying dc signal depends on the characteristic of the brake 103 and the escalator 10. Also, the filtering provided by filter 70 is deliberately selected to be less than optimum, to provide a high-frequency component which is superimposed on the slowly varying dc signal. The amplitude of this high-frequency component is controlled by the amount of filtering (capacitance) in the filter 70. This amplitude influences the duty cycle and pulse width of $V_C$, as discussed in detail in the aforementioned co-pending U.S. patent application. The frequency of the high-frequency component must be much greater than the frequency of the slowly varying dc signal, and is preferably about 1000 Hz. The effect of the duty cycle of the signal $V_S$ on the operation of the escalator brake control system 60 is discussed below and in more detail in the aforementioned co-pending U.S. patent application, which is hereby incorporated by reference.

In the steady-state mode of operation, the relay contact 80 is closed such that the voltage $V_R$ is dependent on the voltage $V_S$ and the resistors 74 and 76. That is, $$V_R = kV_S,$$

where k is dependent on the ohmic values of the resistors 74 and 76. Since $V_S > V_R$ in the steady-stage (see FIG. 3), $V_C$ is high, the transistor 98 is on, the brake coil current $i_c \neq 0$, and the brake shoe 104 is not engaged. A stop signal causes the relay contact 80 to open and the charge on the capacitor 78 holds the value of the constant portion of the reference signal $V_R$ until the ramp portion of $V_R$ begins. That is, the capacitor 78 holds the constant portion of $V_R$ between $t_o$ and point 85 in FIG. 3. Therefore, the reference speed signal $V_R$ is a function of the actual speed signal $V_S$ as illustrated in FIG. 3.

Comparators 86 and 94, and their associated components, generate the ramp portion 87 of $V_R$, starting at point 85, as illustrated in FIG. 3. $V_S$ and $V_R$ are compared in comparator 86. When the escalator 10 is running in the steady-state mode, $V_S > V_R$ and the relay contact 82 is closed. The output of comparator 86 is therefore high, and the voltage $V_Z$ is applied to the non-inverting input terminal of comparator 94 via closed relay contact 82. The output of comparator 94 is also high, inhibiting the ramp signal generator 96. When a stop is initiated, relay contact 82 opens and the charge on the capacitor 95 holds comparator 94 in the inhibit state. Also, the speed signal $V_S$ starts to decrease and approaches the reference signal $V_R$. When $V_S = V_R$, the output of comparator 86 goes low, discharging capacitor 95 to ground, which causes the output of comparator 94 to go low and unlock the ramp signal generator 96.

Turning now to the signal $V_C$ from the comparator 72, under steady-state conditions, the speed signal $V_S > V_R$ and therefore the signal $V_C$ is high. Thus, transistor 98 is on and the current $i_c$ through the brake control coil 102 holds the brake shoe 104 off. When $V_R > V_S$ the control signal $V_C$ goes low, the transistor 98 turns off such that current $i_c = 0$, and the brake shoe 72 is applied. Application of the brake shoe 104 slows the escalator 10 as illustrated by the declining speed signal $V_S$ in FIGS. 2 and 3.

As discussed in the aforementioned U.S. patent application, due to the high frequency component in the signal $V_S$, the control signal $V_C$ comprises several pulses of varying width. The duty cycle of the pulses forming the control signal $V_C$ varies gradually from 100% through 0% and back to 100% so that the average of the control signal $V_C$ changes gradually instead of abruptly. Current in brake control coil 102 follows essentially the gradual variation in $V_C$, because the inductance thereof filters the rapid pulse variations. Also, the diode 100 provides "free wheeling" current through the brake coil 102 while the transistor 98 is not conducting. The net effect is application of the brake shoe 104 in a gradual or quasi-analog fashion rather than a two-state on/off fashion. This technique provides smoother and quicker control, and a closer matching of the actual speed $V_S$ of the escalator 10 to the reference speed signal $V_R$ at all times. A similar technique may also be used for escalator start-up, using an increasing ramp for the reference speed signal $V_R$.

What is claimed is:

1. An escalator, comprising:
   - a conveyor;
   - sensor means for providing an actual speed signal responsive to the speed of said conveyor;
   - stop means for providing an initiation signal when it is required to stop said conveyor;
   - first and second reference means for respectively providing a reference speed signal having first and second portions;
   - said first reference means being responsive to said actual speed signal and to said stop means, said first reference means including first means responsive to said actual speed signal for causing the first portion of said reference speed signal to closely track, without exceeding, the actual speed signal, prior to the initiation signal, and second means for holding the first portion of said reference speed signal constant after said initiation signal;

said second reference means being responsive to said actual speed signal, the first portion of said reference speed signal, and to said stop means, said second reference means including ramp means which, when activated, terminates the first portion of said reference speed signal and initiates the second portion which declines at a predetermined rate, said second reference means further including means for activating said ramp means, subsequent to the initiation signal, upon equality between the actual speed signal and the first portion of the reference speed signal;

control means responsive to said actual speed signal and to said reference speed signal, said control means comparing said reference speed signal and said actual speed signal and providing a control signal in response to said comparison;

and brake means responsive to said control signal for providing a braking action which controls the speed of said conveyor such that said actual speed signal closely tracks said reference speed signal while said reference speed signal is declining at said predetermined rate.

2. The escalator of claim 1 wherein the conveyor includes electrical drive means, and a source of electrical power for said drive means, with the initiation signal being provided by the stop means when the source of electrical power is removed from said drive means.

3. The escalator of claim 1 wherein the first means of the first reference means effectively multiplies the actual speed signal by a predetermined constant having a value less than unity.

4. The escalator of claim 1
wherein the actual speed signal has dc and ac components, the control signal has a first state when the reference speed signal exceeds the actual speed signal, and a second state when the actual speed signal exceeds the reference speed signal, with the duty cycle of the control signal being a function of said ac component, and wherein the brake means is responsive to the average value of said control signal.

5. The escalator of claim 4 wherein the first means of the first reference means effectively multiplies the actual speed signal by a predetermined constant having a value less than unity.

6. The escalator of claim 1 wherein the second means of the first reference means includes a capacitor which has a charge responsive to the magnitude of the reference speed signal at the time the initiation signal is provided by the stop means.

7. The escalator of claim 1 wherein the means which activates the ramp means includes a source of potential which maintains the ramp means deactivated prior to the stop means providing the initiation signal, and a capacitor charged by said source of potential which maintains the ramp means deactivated after the initiation signal has been provided by the stop means, and comparator means which discharges said capacitor to activate the ramp means when the actual speed signal and the reference speed signal are equal.

* * * * *